United States Patent
Voelger

(10) Patent No.: US 9,397,492 B2
(45) Date of Patent: Jul. 19, 2016

(54) PROTECTIVE CIRCUIT

(75) Inventor: Reinhard Voelger, Gross-Zimmern (DE)

(73) Assignee: HOTTINGER BALDWIN MESSTECHNIK GMBH, Darmstadt (DE)

( * ) Notice: Subject to any disclaimer, the term of this patent is extended or adjusted under 35 U.S.C. 154(b) by 467 days.

(21) Appl. No.: 13/813,377

(22) PCT Filed: Aug. 1, 2011

(86) PCT No.: PCT/DE2011/001542
§ 371 (c)(1),
(2), (4) Date: Oct. 25, 2013

(87) PCT Pub. No.: WO2012/025088
PCT Pub. Date: Mar. 1, 2012

(65) Prior Publication Data
US 2015/0318683 A1 Nov. 5, 2015

(30) Foreign Application Priority Data
Jul. 30, 2010 (DE) .......................... 10 2010 032 948

(51) Int. Cl.
*H02H 3/22* (2006.01)
*H02H 3/20* (2006.01)
*H02H 9/04* (2006.01)
*H02H 9/00* (2006.01)

(52) U.S. Cl.
CPC ................. *H02H 3/20* (2013.01); *H02H 9/005* (2013.01); *H02H 9/04* (2013.01); *H02H 9/041* (2013.01)

(58) Field of Classification Search
CPC ............ H02H 3/20; H02H 9/04; H02H 9/005
See application file for complete search history.

(56) References Cited

U.S. PATENT DOCUMENTS

| 4,586,104 | A | 4/1986 | Standler |
| 4,820,933 | A * | 4/1989 | Hong et al. ................. 307/10.1 |
| 5,631,891 | A | 5/1997 | Moritsugu et al. |
| 2006/0061927 | A1 | 3/2006 | Fadell et al. |
| 2007/0153557 | A1 * | 7/2007 | Ochoa .......................... 363/125 |
| 2009/0091872 | A1 | 4/2009 | Ueda |
| 2009/0116158 | A1 | 5/2009 | Graves et al. |
| 2009/0243870 | A1 | 10/2009 | Dai et al. |

FOREIGN PATENT DOCUMENTS

| CN | 201167385 | 12/2008 |
| DE | 199 16 685 A1 | 10/2000 |
| JP | 2002/218645 A | 8/2002 |

OTHER PUBLICATIONS

International Search Report issued by the European Patent Office with regard to the corresponding International Patent Application No. PCT/DE2011/001542.

* cited by examiner

*Primary Examiner* — Thienvu Tran
*Assistant Examiner* — Tien Mai
(74) *Attorney, Agent, or Firm* — Henry M. Feiereisen LLC.

(57) ABSTRACT

A circuit for protecting an electronic functional unit connected to a data line against positive and negative overvoltages includes an analog switch arranged in the data line before the electronic functional unit and a voltage monitor, which is configured to control the analog switch, wherein the voltage monitor is configured to close the analog switch when no overvoltage occurs and to open the analog switch when an overvoltage occurs. The circuit also functions in an energy-saving mode and/or when no supply voltage is applied. The low resistance and bidirectionality of the data line are maintained.

20 Claims, 1 Drawing Sheet

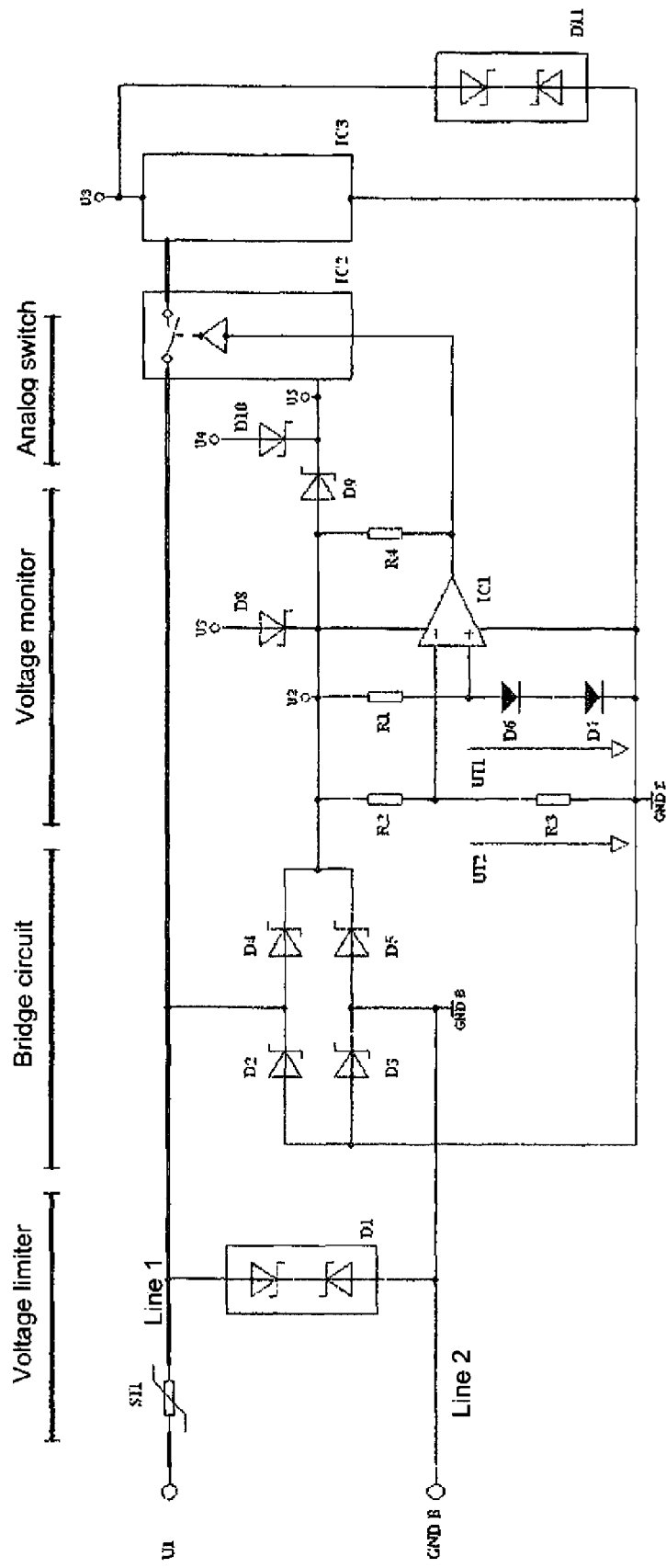

PROTECTIVE CIRCUIT

CROSS-REFERENCES TO RELATED APPLICATIONS

This application is the U.S. National Stage of International Application No. PCT/DE2011/001542, filed Aug. 1, 2011, which designated the United States and has been published as International Publication No. WO 2012/025088 and which claims the priority of German Patent Application, Serial No. 10 2010 032 948.7, filed Jul. 30, 2010, pursuant to 35 U.S.C. 119(a)-(d).

BACKGROUND OF THE INVENTION

The present invention relates to a circuit for protection against overvoltages.

Buses used to transfer data between multiple users via a common transmission path are known in the art. The single-wire bus, or 1-wire bus, is characterized in that a serial bidirectional data transmission and a power supply of connected devices or components can be carried out via a single data line, i.e., the input signals, output signals, and a power supply voltage can be transmitted via one and the same data line. A ground line is required in addition to the data line.

A master device and at least one slave device are provided for each 1-wire bus. A controller such as a microcontroller or PC with an adapter can be used as a master device, which is equipped with a passive or active pull-up resistor. However, a special master device, such as the DS2482-100 or the DS2482-800 from the company Maxim Integrated Products, Inc., can also be used. The slave devices may be e.g. sensors, such as temperature or humidity sensors, memory components, analog-digital converters, digital potentiometers, time recording and real-time clocks, battery protectors, selectors and monitors. The operating voltage of the components is generally between 2.8 V and 6 V. Many components operate with an operating voltage that should be between 2.8 V and 5.5 V. However, only 3.0 V to 3.7 V are approved for some components.

A special feature of the 1-Wire devices is that the slave devices can be supplied with a parasitic voltage from the data line. When the communication is inactive, i.e., in the idle state or rest state, the data line is at a high potential of, for example, 5 V, and charges a respective storage capacitor integrated in each slave device. The data line is hereby pulled up to the high potential with the aid of a pull-up resistor. During operating phases where the data line is at a low potential, each slave device is powered from its storage capacitor.

A data line of a 1-wire bus operates bidirectionally at a potential of, for example, 3.3 V and is provided with an internal pull-up resistor via a master device. Accidental application of a voltage to the input port or terminal of the master device (the data line) of greater than about 0.5 volts above its supply voltage, i.e. of a voltage greater than about Vcc+0.5 V, results in destruction of the master device, which must therefore be protected from such an overvoltage. The same applies to a circuit or another electronic functional unit connected to the data line. This problem occurs not only with a 1-Wire bus, but also with other bidirectional bus systems, such as an I²C-bus or an RS485 bus in half-duplex mode.

Previously known devices for protection against positive and negative overvoltages, such as the protection circuit described in the document DE 199 16 685 A1, frequently operate with a limiting or ballast resistor. Such protection circuits are not suitable for a 1-wire bus, because a corresponding voltage would drop across the ballast resistor, so that the slave devices connected to the 1-wire bus would receive an inadequately low supply voltage due to the voltage drop across the ballast resistor.

A similar situation occurs with protection circuits having a Zener diode or Z-diode, across which at a voltage drop would also occur and which moreover would also not protect against negative overvoltages. Conversely, protection circuits with a bidirectional suppressor diode would protect only against overvoltage transients, but not against prolonged overvoltages. Protection circuits realized with a field effect transistor are integrated in line carrying a positive voltage or negative voltage, whereas protection circuits realized with two field effect transistors are integrated in a line carrying a positive voltage. Bi-directionality could therefore be implemented in protection circuits having field effect transistors either not at all or only with directional control, wherein a bidirectional protection circuit with direction control is not suitable for use in conjunction with a 1-wire bus.

Other prior art protection circuits are for similar reasons also not suitable for a 1-wire bus. For example, in protection devices with a varistor, a corresponding voltage would drop across the varistor. Protection circuits with a thyristor, which triggers a fuse in the event of an active short-circuit of a supply voltage, would not operate without a supply voltage and would thus not protect against negative overvoltages.

SUMMARY OF THE INVENTION

It is therefore the object of the invention to obviate the aforementioned disadvantages of the prior art and to provide a protection circuit capable of protecting an electronic functional unit connected to a data line against positive and negative overvoltages, which retaining its functionality even in a low-power mode, an energy-saving mode and/or when no supply voltage is applied. Moreover, the low impedance and bi-directionality of the data cable should not be adversely affected.

According to a first embodiment of the invention, a circuit for protecting an electronic functional unit connected to a data line against positive and negative overvoltages is provided. The circuit includes an analog switch arranged in the data line upstream of the electronic functional unit and a voltage monitor configured to control the analog switch, wherein the voltage monitor is configured to close the analog switch, when no over-voltage occurs, and to open the analog switch, when an overvoltage occurs.

The voltage monitor monitors the data line with respect to a positive or negative overvoltage and disconnects the data line from the electronic functional unit by way of the analog switch when an overvoltage occurs. The analog switch ensures that the low impedance and bi-directionality of the data line is not affected. Since the overvoltage can be used as a supply voltage, the functionality of the circuit is ensured even in power-saving mode and/or when no supply voltage is applied.

According to a second embodiment of the invention, the voltage monitor has a comparator which is configured to control the analog switch via an output voltage of the comparator. In normal operation of the circuit, the output of the comparator assumes a positive end position. When an overvoltage occurs, the output of the comparator assumes a negative end position. Reliable switching of the analog switch is thus achieved.

According to a third embodiment of the invention, the voltage monitor has a pull-up resistor arranged between a higher supply potential of the comparator and an output of the comparator and/or a positive feedback resistor arranged between a positive input of the comparator and the output of the comparator. The pull-up resistor ensures that the level of the output voltage of the comparator is sufficient for reliably switching the analog switch. By using the positive feedback resistor, the output voltage of the comparator can be prevented from switching too frequently and too irregularly, when the input voltages present at the positive input and a negative input of the comparator show excessive variations.

According to a fourth embodiment of the invention, the voltage monitor has a series circuit composed of a resistor and at least one forward-biased diode which is arranged between a higher supply potential of the comparator and a lower supply potential of the comparator, wherein the series circuit is configured to adjust at a connecting point between the resistor and the at least one diode an input voltage applied at a positive input of the comparator voltage. Since the voltage drop across the two diodes remains substantially constant even when the higher supply potential of the comparator increases, the input voltage applied to the positive input of the comparator can be readily kept nearly constant.

According to a fifth embodiment of the invention, the voltage monitor has a series circuit of two resistors arranged between a higher supply potential of the comparator and a lower supply potential of the comparator, wherein the series circuit is configured to adjust at a connection point between the two resistors an input voltage applied to a negative input of the comparator. The input voltage applied to the negative input of the comparator increases when the higher supply potential of the comparator and thus the voltage applied to the series connection of the two resistors voltage increases. When the input voltage applied to the negative input of the comparator exceeds the input voltage applied to the positive input of the comparator, the output of comparator flips from a positive end position to a negative end position, which reliably opens the analog switch.

According to a sixth embodiment of the invention, the voltage monitor has a forward-biased diode arranged between a first reference potential and a higher supply potential of the comparator, wherein the diode is configured to disconnect the first reference potential when an overvoltage occurs. This approach ensures that the overvoltage is used as the supply voltage for the comparator.

According to a seventh embodiment of the invention, the forward-biased diode arranged between the first reference potential and the higher supply potential of the comparator is a Schottky diode. This enables fast disconnection of the first reference potential even at a low overvoltage.

According to an eighth embodiment of the invention, the voltage monitor has a forward-biased diode arranged between a second reference potential and a supply potential of the analog switch, wherein the diode is configured to disconnect the second reference potential when an overvoltage occurs. This ensures that the overvoltage is used as the supply voltage for the analog switch.

According to a ninth embodiment of the invention, the forward-biased diode arranged between the second reference potential and the supply potential of the analog switch is a Schottky diode. This enables fast disconnection of the second reference potential even at a low overvoltage.

According to a tenth embodiment of the invention, the voltage monitor has a forward-biased diode arranged between a higher supply potential of the comparator and a supply potential of the analog switch, wherein the diode is configured to disconnect the higher supply potential of the comparator and the supply potential of the analog switch when no overvoltage occurs. In this way, on one hand, a clean separation of the supply potentials of the comparator and of the analog switch is possible in normal operation of the circuit and, on the other hand, the overvoltage can be used as supply voltage for both the comparator and the analog switch.

According to an eleventh embodiment of the invention, the diode arranged between the higher supply potential of the comparator and the supply potential of the analog switch is a Schottky diode. The overvoltage can then be quickly used as supply voltage for the analog switch even when the overvoltage is relatively low.

According to a twelfth embodiment of the invention, the circuit has a bridge circuit arranged upstream of the voltage monitor and composed of four diodes, wherein the bridge circuit is configured to rectify an overvoltage, and to supply the rectified overvoltage to the voltage monitor. Due to the bridge circuit, only a positive voltage is internally applied to the circuit and the rectified overvoltage can always be used as a supply voltage.

According to a thirteenth embodiment of the invention, the four diodes of the bridge circuit are Schottky diodes, which enables fast switching the diode even at a low overvoltage and a reliable rectification of the overvoltage.

According to a fourteenth embodiment of the invention, the circuit has a bidirectional suppressor diode arranged upstream of the analog switch between the data line and a ground line, wherein the bidirectional suppressor diode is configured to limit the positive and negative overvoltages. The circuit also has an automatic-reset fuse arranged in the data line upstream of a connecting point of the data line and the bidirectional suppressor diode, wherein the automatic-reset fuse is configured to limit a current flowing through the bidirectional suppressor diode. The automatic-reset fuse has a low resistance in normal operation of the circuit, thus ensuring that the data line retains a low-resistance in the normal operation of the circuit. The automatic-reset fuse limits the current flowing through the bidirectional suppressor diode current and thus prevents its destruction. The combination of the automatic-reset fuse and the bidirectional suppressor diode ensures that both positive and negative overvoltages are limited in a first step.

According to a fifteenth embodiment of the invention, the circuit has a bidirectional suppressor diode arranged between a higher supply potential of the electronic functional unit and a lower power supply potential of the electronic functional unit, wherein the bidirectional suppressor diode is configured to limit overvoltage transients in electronic functional unit. The bidirectional suppressor diode prevents damage to the electronic functional unit when rapid overvoltage transients occur, until the voltage limiter becomes effective.

BRIEF DESCRIPTION OF THE DRAWING

The invention will now be illustrated with reference to an exemplary embodiment in conjunction with a schematic drawing, which shows in:

FIG. 1 an exemplary circuit for protecting an electronic functional unit connected to a data line from positive and negative overvoltages.

DETAILED DESCRIPTION OF PREFERRED EMBODIMENTS

FIG. 1 shows an exemplary circuit for protecting a functional unit IC3 connected to a data line Line 1 from positive and negative overvoltages. The electronic functional unit IC3 may be a component, a discrete circuit or an integrated circuit (IC).

The data line Line 1 may, for example, be the data line of a single-wire bus or 1-wire bus, which can operate bidirectionally at a potential of for example V1=3.3 V. A ground line Line 2 is provided in addition to the data line Line 1, which may, for example, be the ground line of a 1-wire bus having a potential of for example GND B. Instead of a 1-Wire bus, another bidirectional bus system such as an I²C-bus or an RS485 bus in half-duplex mode may also be used.

The electronic functional unit IC3 may, for example, be a master device such as a microcontroller or a personal computer with a corresponding adapter, which is equipped with a passive or active pull-up resistor. Alternatively, the electronic functional unit IC3 may be a special master device such as the DS2482 100 or the DS2482-800 from the company Maxim Integrated Products, Inc. The electronic functional unit IC3 may also be any other type of component which sends or receives data over a low-impedance bidirectional line, for example a field-programmable gate array (FPGA).

The circuit includes a voltage limiter, a bridge circuit and a voltage monitor, whose individual components will be explained in more detail below. In addition, an analog switch IC2 is arranged in the data line Line 1 before the electronic functional unit IC3 and a bidirectional suppressor diode D11 is arranged in the electronic functional unit IC3.

The voltage limiter includes a bidirectional suppressor diode D1 arranged between the data line Line 1 and the ground line Line 2. The bidirectional suppressor diode D1 is capable of limiting the positive and negative overvoltages and may have a breakdown voltage of for example 6V. The voltage limiter further includes an auto-fuse or automatic-reset fuse 811 which is arranged in the data line Line 1 upstream of a connecting point of the data line Line 1 and the bidirectional suppressor diode D1 and limits a current flowing through the bidirectional suppressor diode D1. The fuse may be designed, for example, for a maximum voltage of 30 V and a rated current of 50 mA. Such automatic-reset fuses are distributed, for example, by the company Bourns, Inc., under the brand name Multifuse®.

The bridge circuit includes four diodes D2, D3, D4 and D5, for example Schottky diodes with a breakdown voltage of 40 V or silicon diodes. Instead of the individual diodes D2, D3, D4 and D5, a bridge rectifier with diodes silicon or a bridge rectifier with Schottky diodes as a complete unit may also be employed. The bridge circuit is connected between the diodes D2 and D4 to the data line Line 1, between the diodes D3 and D5 to the ground line Line 2, between the diodes D4 and D5 to an input of the voltage monitor having a higher supply potential U2 of a comparator IC1, and between the diodes D2 and D3 to an input of the voltage monitor having a lower supply potential GND E of the comparator 101.

The voltage monitor includes the comparator 101, which may, for example, be an operational amplifier connected as a comparator with a positive supply voltage of up to Vcc=35 V, but may also be a discrete circuit, a series circuit composed of a resistor R1 and two forward-biased diodes D6 and D7 arranged between the higher supply potential U2 of the comparator and the lower supply potential GND E of comparator IC1, or series circuit of two resistors R2 and R3 arranged between the higher supply potential U2 of the comparator 1C1 and the lower supply potential GND E of the comparator IC1, or a pull-up resistor R4 arranged between the higher supply potential U2 of the comparator IC1 and an output of the comparator IC1. The voltage monitor further includes a forward-biased diode D8 arranged between a first reference potential U3 and the higher supply potential U2 of the comparator IC1, a forward-biased diode D10 arranged between a second reference potential U4 and a supply potential U5 of the analog switch first IC2, and a forward-biased diode D9 arranged between the higher supply potential U2 of the comparator IC1 and the supply potential U5 of the analog switch 1C2.

The resistors R1, R2, R3 and R4 may, for example, be resistors with a respective tolerance of the resistance value of ±1%, and a corresponding temperature coefficient TK50, i.e. a temperature-dependent change of the resistance value of 50 ppm/° C.=0.005%/° C. The diodes D6 and D7 may, for example, be silicon diodes. A Zener diode may also be employed instead of the two diodes D6 and D7. The diodes D8, D9 and D10 may, for example, be Schottky diodes with a breakdown voltage of 40V or silicon diodes. Instead the individual diodes D8, D9 and D10, a bridge rectifier with silicon diodes or a bridge rectifier with Schottky diodes may be provided as a complete unit.

The analog switch IC2 may, for example, be an electronic switch implemented with field effect transistors. The analog switch IC2 may have, for example, a positive supply voltage of up to Vcc=35 V, and is arranged in the data line Line 1 upstream of a terminal of the electronic functional unit IC3 to which the data line Line 1 is connected.

The bidirectional suppressor diode D11 is arranged between the first reference potential U3, which serves as a higher supply potential of the electronic functional unit IC3, and the lower supply potential GND E of the comparator IC1, which serves as the lower supply potential of the electronic functional unit IC3. The bidirectional suppressor diode D11 is capable of limiting positive and negative overvoltages and may have a breakdown voltage of for example 3.3 V.

In normal operation of the circuit, the automatic-reset fuse SI1 is not under load and has hence a low resistance. Neither a positive nor a negative overvoltage occurs. The bidirectional suppressor diode D1 is therefore blocking.

The comparator IC1 is supplied from the first reference potential U3 via the diode D8. The higher supply potential U2 of the comparator IC1 is reduced compared to the first reference potential U3 by a forward voltage of the diode D8. When the diode D8 is a Schottky diode, it may have a forward voltage of for example 0.2 V. The higher supply potential U2 of the comparator IC1 is then U2=U3−0.2 V.

The analog switch IC2 is supplied by the second reference potential U4 via the diode D10. The supply potential U5 of the analog switch IC2 is reduced compared to the second reference potential U4 by the forward voltage of the diode D10. When the diode D10 is a Schottky diode, it may have a forward voltage of for example 0.2 V. The supply potential U5 of the analog switch IC2 is then U5=U4−0.2 V.

The first reference potential U3 is for example 3.3 V, and the second reference potential is for example 5 V. Therefore, U4>U3. For the same reason, U5>U2. The diode D9 is thus blocking in normal operation of the circuit.

A voltage resulting from the potential difference between the higher supply potential U2 of the comparator IC1 and the lower supply potential GND E of the comparator IC1 is applied to the series circuit composed of the resistor R1 and the two forward-biased diodes D6 and D7. A voltage UT1 of approximately 1.0 V across the diodes D6 and D7 is set via the resistor R1 and the diodes D6 and D7. This voltage UT1 is applied to a positive input of the comparator IC1. Even when the voltage across the resistor R1 and the diodes D6 and D7 increases, the voltage UT1 across the diodes D6 and D7 and hence also the input voltage applied to the positive input of the comparator IC1 remain nearly constant, i.e. remain at about 1.0 V.

The voltage resulting from the difference in the potential between the higher supply potential U2 of the comparator IC1 and the lower supply potential GND E of the comparator IC1 is also applied to the series circuit formed of the resistors R2 and R3. The resistors R2 and R3 form a voltage divider, which is adjusted so that the voltage drop UT2 across the resistor R3 is approximately 0.9 V in normal operation of the circuit; the voltage UT2 is tapped via the negative input of the comparator IC1 and hence represents the input voltage applied to the negative input of the comparator IC1.

Thus, in normal operation of the circuit, an input voltage of approximately 1.0 V is applied to the positive input of the comparator IC1 and an input voltage of about 0.9 V is applied to the negative input of the comparator IC1. The positive input of the comparator IC1 is therefore more positive than the negative input. Stated differently, the output of comparator IC1 flips into a positive end position. The analog switch IC2 is closed, i.e. activated, by the output voltage supplied at the output of the comparator IC1. The analog switch IC2 is then closed, ensuring normal operation of the data line Line 1.

The pull-up resistor R4 is only needed when the comparator IC1 is an operational amplifier configured as a comparator and lacks so-called rail-to-rail output, i.e. an output that can be adjusted between the higher supply potential U2 of the comparator IC1 and the lower supply potential GND E of the comparator IC1. In the aforedescribed case of the positive end position, the output voltage present at the output of the comparator IC1 may then be too low to ensure reliable switching of the analog switch IC2. A sufficiently high output voltage can be attained with the pull-up resistor R4.

A positive feedback resistor arranged between the positive input of comparator IC1 and the output of comparator IC1 may be provided in addition to the pull-up resistor R4. Threshold values where the respective output voltage of the comparator IC1 flips can be adjusted via the positive feedback resistor. Turn-on and turn-off threshold values then do not coincide, but are instead mutually offset by the so-called switching hysteresis. In this way, small fluctuations in the input voltages at the positive input and the negative input of the comparator IC1 can be prevented from switching the output voltage of the comparator IC1 too frequently and too irregularly.

The diodes D2, D4 and D5 are irrelevant for normal operation of the circuit. The diode D3 ensures the connection to the potential GND B of the ground line Line 2.

When the overvoltage on the data line Line 1 is positive, the voltage limiter which includes the automatic-reset fuse SI1 and the bidirectional suppressor diode D1 limits, in a first step, the overvoltage to, for example, approximately 7.5 V. The current flowing through the bidirectional suppressor diode D1 is limited by the automatic-reset fuse SI1. This prevents destruction of the bidirectional suppressor diode D1.

The diode D4 of the bridge circuit which is connected to the data line Line 1 becomes conductive. The higher supply potential U2 of comparator IC1 is raised by the diode D4. Consequently, the higher supply potential U2 of the comparator IC1 is greater than the first reference potential U3, i.e. U2>U3. The diode D8 is therefore blocking and thus disconnects the normal supply voltage in form of the first reference potential U3 from the comparator IC1. If the higher supply potential U2 of the comparator IC1, after being reduced by the forward voltage of the diode D9, is greater than the second reference potential U4, i.e. U2>(U4+0.2 V), the diode D10 is also blocking, and thus disconnects the normal supply voltage in form of second reference potential U4 from the analog switch IC2. Both the comparator IC1 and the analog switch IC2 can thus be supplied by the positive overvoltage.

Despite the increase of the higher supply potential U2 of the comparator IC1, the voltage drop UT1 across the diodes D6 and D7 is still approximately 1, 0 V as in normal operation of the circuit. The voltage UT1 is tapped at the positive input of the comparator 1 C1 and therefore represents the input voltage at the positive input of the comparator IC1. Due to the increase of the higher supply potential U2 of the comparator IC1, a higher voltage is present at the voltage divider formed of the resistors R2 and R3. The voltage drop UT2 across the resistor R3 is therefore also greater and exceeds 1.0 V. This voltage tapped at the negative input of the comparator IC1 represents the input voltage at the negative input of the comparator IC1

The input voltage at the negative input of the comparator IC1 is greater than the input voltage at the positive input of the comparator IC1. This causes the output of the comparator IC1 to flip into a negative end position, i.e., the magnitude of the output voltage applied to the output of the comparator IC1 goes to 0 V. This output voltage then opens the analog switch IC2, disconnecting the downstream electronic functional unit IC3 from the positive overvoltage.

When the overvoltage on the data line Line 1 is positive, the voltage limiter which includes the automatic-reset fuse SI1 and the bidirectional suppressor diode D1, limits the overvoltage in a first step to approximately 7.5 V. The current flowing through the bidirectional suppressor diode D1 is limited by the automatic-reset fuse SI1, which prevents destruction of the bidirectional suppressor diode D1.

The diode D5 of the bridge circuit connected to the data line Line 1 becomes conducting and raises the higher supply potential U2 of comparator IC1. Consequently, the higher supply potential U2 of the comparator IC1 is greater than the first reference potential U3, i.e. U2>U3. The diode D8 is then blocking and disconnects the normal supply voltage in form of the first reference potential U3 from the comparator IC1. If the higher supply potential U2 of the comparator IC1 which is reduced by the forward voltage of the diode D9 is greater than the second reference potential U4, i.e. U2>(U4+0.2 V), the diode D10 is blocking, and thus disconnects the normal supply voltage in form of the second reference potential U4 from the analog switch IC2. Thus, the comparator IC1 and the analog switch IC2 can be supplied by the positive overvoltage.

Despite of the increase in the higher supply potential U2 of the comparator IC1, the voltage drop UT1 across the diodes D6 and D7 is still approximately 1.0 V as in normal operation of the circuit voltage. The voltage UT1 is tapped at the positive input of the comparator IC1 and thus represents the input voltage at the positive input of the comparator IC1. Due to the increase in the higher supply potential U2 of the comparator IC1, a higher voltage is present at the voltage divider formed of the resistors R2 and R3. The voltage drop UT2 across the resistor R3 is therefore also greater and exceeds 1.0 V. The voltage tapped at the negative input of the comparator IC1 represents the input voltage at the negative input of the comparator IC1.

The input voltage at the negative input of the comparator IC1 is thus greater than the input voltage at the positive input of the comparator IC1. This causes the output of the comparator IC1 to flip into the negative end position, i.e. the magnitude of the output voltage applied to the output of the comparator IC1 goes to 0 V. This output voltage opens the analog switch IC2. The downstream electronic functional unit IC3 is then disconnected from the positive overvoltage.

The bidirectional suppressor diode D11 prevents damage to the electronic functional unit IC3 during fast overvoltage transients, until the voltage limiter which includes the automatic-reset fuse SI1 and bidirectional suppressor diode D1 takes over.

The analog switch IC2 is turned off or opened with a certain switching delay when an overvoltage occurs. The delay was approximately 20 µs for an exemplary test circuit. However, it was noted after extensive testing that this delay had no adverse effect on the protective electronic functional unit IC3. The switching behavior can be optimized considerably by suitable selection of the comparator IC1 or the operational amplifier connected as a comparator and optionally the analog switch IC2.

The aforedescribed circuit operates with supplied power and without any supplied power, as well as in a power-saving mode, since an incorrect voltage or an overvoltage can be used as supply voltage. Continuous operation is also possible, i.e. protection against longer-lasting overvoltages is ensured. By connecting the bridge circuit with the four diodes D2, D3, D4 and D5 upstream of the voltage monitor, safe operation is ensured even with a negative overvoltage. In other words, the circuit protects against positive and negative overvoltages, wherein it is irrelevant whether the circuit is powered or not. The circuit can be designed for overvoltages of for example maximally ±30 V.

The voltage monitor is triggered above a certain overvoltage and disconnects the overvoltage from the protected electronic functional unit IC3 with the aid of the analog switch IC2. In normal operation, the characteristic properties of the data line Line 1 are not affected by the circuit, meaning that bidirectionality and low impedance is maintained. This is achieved by using the automatic-reset fuse SI1 which has a low-impedance in normal operation and the analog switch IC2 which ensures bidirectionality and low impedance In summary, the present invention relates to a circuit for protecting an electronic functional unit IC3 connected to a data line Line 1 against positive and negative overvoltages. The circuit includes an analog switch IC2 arranged in the data line Line 1 upstream of the electronic functional unit IC3. The circuit also includes a voltage monitor configured to control the analog switch IC2, wherein the voltage monitor is configured to close the analog switch IC2 when no overvoltage occurs, and to open the analog switch IC2 when an overvoltage occurs. The circuit operates also in a power-saving mode and/or when no supply voltage is applied. However, the low impedance and bidirectionality of the data line Line 1 remain unchanged.

The invention claimed is:

1. A circuit for protecting an electronic functional unit connected to a data line against positive and negative overvoltages, comprising:
   an analog switch arranged in the data line upstream of the electronic functional unit; and
   a voltage monitor configured to control the analog switch, wherein the voltage monitor is configured to close the analog switch when no overvoltage occurs, and to open the analog switch when an overvoltage occurs, said voltage monitor comprising a comparator configured to control the analog switch via an output voltage of the comparator and a first forward-biased diode which is arranged between a first reference potential and a higher supply potential of the comparator and is configured to disconnect the first reference potential when an overvoltage occurs.

2. The circuit of claim 1, wherein the voltage monitor comprises at least one of a pull-up resistor arranged between a higher supply potential of the comparator and an output of the comparator and a positive feedback resistor coupled to a positive input of the comparator.

3. The circuit of claim 1, wherein the voltage monitor comprises a series circuit formed of a resistor and at least one second forward-biased diode, said series circuit being arranged between a higher supply potential of the comparator and a lower supply potential of the comparator and configured to adjust an input voltage at a positive input of the comparator at a connection point between the resistor and the at least one second forward-biased diode.

4. The circuit of claim 1, wherein the voltage monitor comprises a series circuit formed of two resistors arranged between a higher supply potential of the comparator and a lower supply potential of the comparator, for adjusting an input voltage applied to a negative input of the comparator at a connection point between the two resistors.

5. The circuit of claim 1, wherein the forward-biased diode arranged between the first reference potential and the higher supply potential of the comparator is a Schottky diode.

6. The circuit of claim 1, further comprising a bridge circuit formed of four diodes disposed upstream of the voltage monitor, wherein the bridge circuit is configured to rectify an overvoltage and to supply the rectified overvoltage to the voltage monitor.

7. The circuit of claim 6, wherein the four diodes of the bridge circuit are Schottky diodes.

8. The circuit of claim 1, further comprising:
   a bidirectional suppressor diode arranged upstream of the analog switch between the data line and a ground line, wherein the bidirectional suppressor diode is configured to limit positive and negative overvoltages, and
   an automatic-reset fuse arranged in the data line upstream of a connecting point of the data line and the bidirectional suppressor diode, wherein the automatic-reset fuse is configured to limit a current flowing through the bidirectional suppressor diode.

9. The circuit of claim 1, further comprising a bidirectional suppressor diode arranged between a higher supply potential of the electronic functional unit and a lower supply potential of the electronic functional unit, wherein the bidirectional suppressor diode is configured to limit overvoltage transients in the electronic functional unit.

10. A circuit for protecting an electronic functional unit connected to a data line against positive and negative overvoltages, comprising:
    an analog switch arranged in the data line upstream of the electronic functional unit; and
    a voltage monitor configured to control the analog switch, wherein the voltage monitor is configured to close the analog switch when no overvoltage occurs, and to open the analog switch when an overvoltage occurs, said voltage monitor comprising a comparator configured to control the analog switch via an output voltage of the comparator and a first forward-biased diode which is arranged between a second reference potential and a supply potential of the analog switch and is configured to disconnect the second reference potential when an overvoltage occurs.

11. The circuit of claim 10, wherein the forward-biased diode arranged between the second reference potential and the supply potential of the analog switch is a Schottky diode.

12. The circuit of claim 10, wherein the voltage monitor comprises at least one of a pull-up resistor arranged between a higher supply potential of the comparator and an output of the comparator and a positive feedback resistor coupled to a positive input of the comparator.

13. The circuit of claim 10, wherein the voltage monitor comprises a series circuit formed of a resistor and at least one second forward-biased diode, said series circuit being arranged between a higher supply potential of the comparator and a lower supply potential of the comparator and configured to adjust an input voltage at a positive input of the comparator at a connection point between the resistor and the at least one second forward-biased diode.

14. The circuit of claim 10, wherein the voltage monitor comprises a series circuit formed of two resistors arranged between a higher supply potential of the comparator and a lower supply potential of the comparator, for adjusting an input voltage applied to a negative input of the comparator at a connection point between the two resistors.

15. The circuit of claim 10, further comprising a bridge circuit formed of four diodes disposed upstream of the voltage monitor, wherein the bridge circuit is configured to rectify an overvoltage and to supply the rectified overvoltage to the voltage monitor.

16. A circuit for protecting an electronic functional unit connected to a data line against positive and negative overvoltages, comprising:
   an analog switch arranged in the data line upstream of the electronic functional unit; and
   a voltage monitor configured to control the analog switch, wherein the voltage monitor is configured to close the analog switch when no overvoltage occurs, and to open the analog switch when an overvoltage occurs, said voltage monitor comprising a comparator configured to control the analog switch via an output voltage of the comparator and a first forward-biased diode which is arranged between a higher supply potential of the comparator and a supply potential of the analog switch and is configured to disconnect the higher supply potential of the comparator and the supply potential of the analog switch when no overvoltage occurs.

17. The circuit of claim 16, wherein the diode arranged between the higher supply potential of the comparator and the supply potential of the analog switch is a Schottky diode.

18. The circuit of claim 16, wherein the voltage monitor comprises at least one of a pull-up resistor arranged between a higher supply potential of the comparator and an output of the comparator and a positive feedback resistor coupled to a positive input of the comparator.

19. The circuit of claim 16, wherein the voltage monitor comprises a series circuit formed of a resistor and at least one second forward biased diode, said series circuit being arranged between a higher supply potential of the comparator and a lower supply potential of the comparator and configured to adjust an input voltage at a positive input of the comparator at a connection point between the resistor and the at least one second forward-biased diode.

20. The circuit of claim 16, wherein the voltage monitor comprises a series circuit formed of two resistors arranged between a higher supply potential of the comparator and a lower supply potential of the comparator, for adjusting an input voltage applied to a negative input of the comparator at a connection point between the two resistors.

* * * * *